United States Patent [19]

Stewart et al.

[11] Patent Number: 4,838,650

[45] Date of Patent: Jun. 13, 1989

[54] REAR VIEW MIRROR

[75] Inventors: Anthony Stewart, 27 Binnie Street, Gourock, Renfrewshire, Scotland; Juergen Schukey, Hamburg, Fed. Rep. of Germany

[73] Assignee: Anthony Stewart, Gourock, Scotland

[21] Appl. No.: 877,004

[22] Filed: Jun. 20, 1986

[30] Foreign Application Priority Data

Jun. 21, 1985 [DE] Fed. Rep. of Germany ....... 3522204

[51] Int. Cl.$^4$ .............................................. G02B 17/00
[52] U.S. Cl. .................................... 350/280; 350/281; 350/633
[58] Field of Search ............... 350/276, 278, 280, 281, 350/429, 604, 605, 632, 637, 634, 633

[56] References Cited

U.S. PATENT DOCUMENTS

| | | | |
|---|---|---|---|
| 2,964,999 | 12/1960 | Mazur | 350/281 |
| 3,158,076 | 11/1964 | Back et al. | 350/429 |
| 3,722,984 | 3/1973 | Brean | 350/280 |
| 4,088,398 | 5/1978 | Zoursel | 350/280 |
| 4,281,898 | 8/1981 | Ochiai et al. | 350/281 |
| 4,403,829 | 9/1983 | Thujiuchi et al. | 350/637 |
| 4,443,057 | 4/1984 | Bauer et al. | 350/281 |
| 4,448,488 | 5/1984 | Nakaho | 350/278 |
| 4,494,420 | 1/1985 | Sakuma | 350/633 |
| 4,540,252 | 9/1985 | Hayashi et al. | 350/637 |

Primary Examiner—John K. Corbin
Assistant Examiner—Loha Ben
Attorney, Agent, or Firm—Gerald J. Ferguson, Jr.

[57] ABSTRACT

The present invention provides a rear view mirror for a motor vehicle which is automatically adjustable to prevent the effects of dazzle e.g. by a vehicle approaching from behind at night. The mirror comprises an adjustable mirror surface (2) housed in a casing (3) and connected in an adjustable manner to an actuator (8) which engages an annular cam formation (26) having various cam profile heights whereby the mirror surface (2) can be adjusted by tilting. The cam formation (26) is part of a toothed wheel (11) driven by a small electric motor (21) the control circuit of which is actuated by a photosensor (38) so that mirror tilting is dependent on light intensity thresholds. The arrangement enables the various mirror adjustments to be achieved using uni-directional rotation of the motor and the toothed wheel (11) and this has the advantage of providing more reliable operation with less noise. The present adjusting mirror is also relatively inexpensive to manufacture.

34 Claims, 10 Drawing Sheets

Fig. 3
Fig. 5
Fig. 4
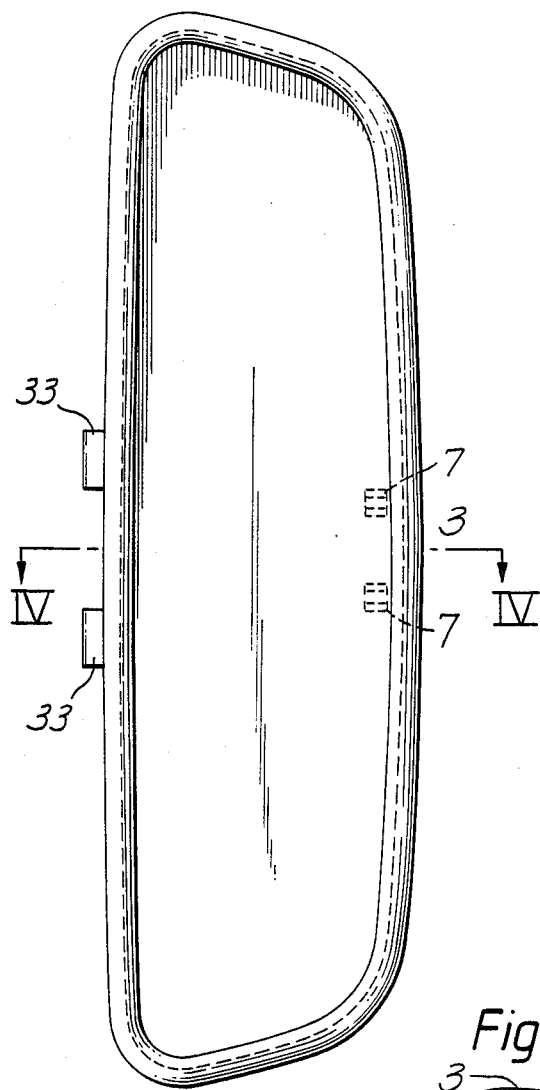
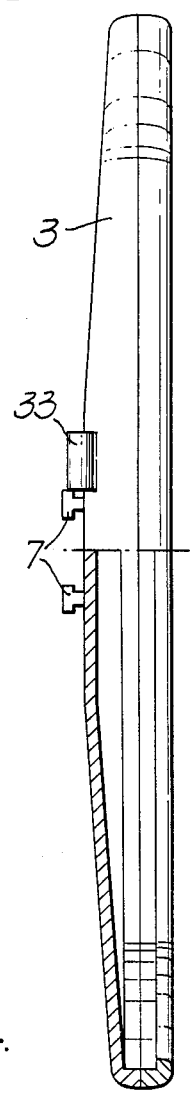
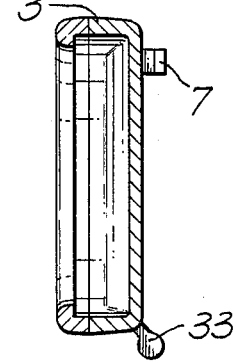

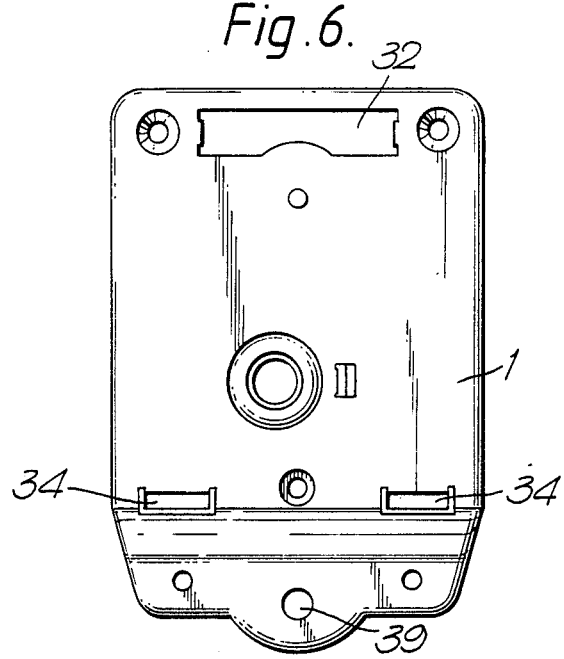
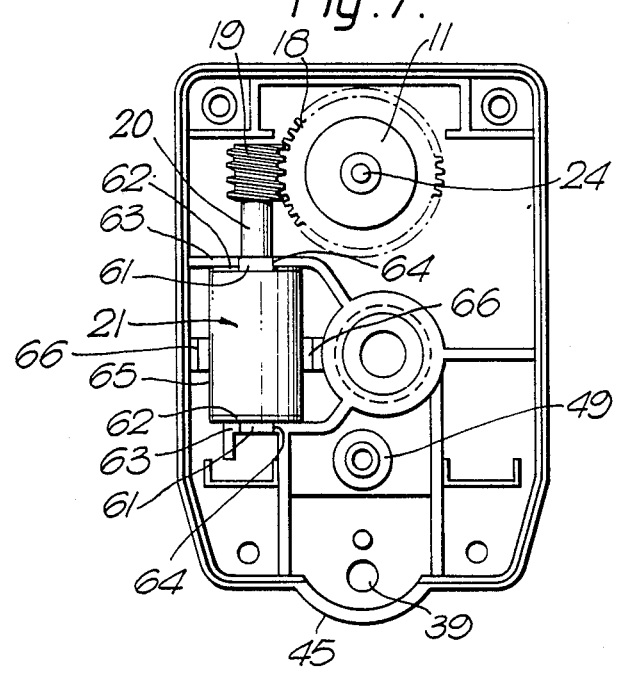

REAR VIEW MIRROR

This invention relates to a rear view mirror for vehicles with an adjustable mirror surface to prevent the effects of glare.

Rear view mirrors with a mirror surface which is automatically adjusted by an electric motor in conditions of increased light intensity have become known in various embodiments. There are rear view mirrors in which the mirror surface is tilted in a fixed casing as well as ambodiments in which the casing complete with mirror surface is adjusted vis a vis a bearing arm. However, the embodiments known so far have certain drawbacks with regard to practical use. In particular it appeared that relatively strong motors were required and these created excessive noise. In addition the previous automatic rear view mirrors could not be manufactured at a suitable price.

The object of the present invention is therefore to improve a rear view mirror as described in the introduction in such a way that it is inexpensive to manufacture, is largely maintenance-free and does not wear very easily, while the tilting movement is carried out quietly and within small spacial dimensions.

This problem is solved by the invention in that the mirror surface is adjustably connected to an actuator which is engaged in a cam surface formation, the various profile heights of which correspond to various angles of adjustment in respect of the mirror.

In such a rear view mirror the adjustment of the rear view mirror is carried out before the driver of the vehicle notices the glare. Thus the driver need not let go of the steering wheel of the vehicle in order to manually adjust the mirror to stop the glare. This is particularly dangerous in situations where the driver is already being dazzled through the mirror, as the effect, of the dazzle means that the area ahead of the vehicle can no longer be seen clearly enough and manually adjusting the rear view mirror further distracts the driver from the traffic.

According to a preferred embodiment of the invention, the intensity of the light falling on the mirror is measured by a photoelectric cell. The mirror is then adjusted in accordance with the determined light intensity over a predetermined light intensity threshold value in order to thus prevent the driver being dazzled.

The adjusting movements are preferably carried out with the aid of a toothed wheel which carries the cam surface formation, and are transferred from an electric motor onto the actuator which is connected to a casing containing the mirror surface. The design of the cam formation ensures that the motor need only revolve in the same direction and all toothing of the drive is always engaged. Early wear and undesirable impacts inside the drive can thus be avoided.

The dimensions of the electric motor can be relatively small as it only needs to produce the small amounts of power which are required to overcome bearing friction. Due to the structural design of the connection between the parts which are adjusted in respect of each other the electric motor need not do hardly any lifting work.

According to a further preferred embodiment of the invention, the light intensity threshold value which causes the rear view mirror to be adjusted can be regulated with the aid of an adjusting wheel. The rear view mirror can therefore be adjusted by drivers to suit various light intensity levels and sensitivities to light.

According to another preferred embodiment of the invention the casing of the rear view mirror is designed in such a way that depending on purpose and availability various sizes of mirror glasses can be inserted into the casing.

Further details of the invention are described in the following with the aid of the attached diagrams which illustrate one preferred embodiment of the invention.

In the drawings:

FIG. 3 is a side view of the casing containing the mirror surface, FIG. 4 is a cross section through the casing along the line IV—IV - in FIG. 3.

FIG. 5 is a half top view of the casing in FIG. 3,

FIG. 6 is a front view of the main casing.

FIG. 7 is a schematic view of the construction of the casing,

Figure 1:
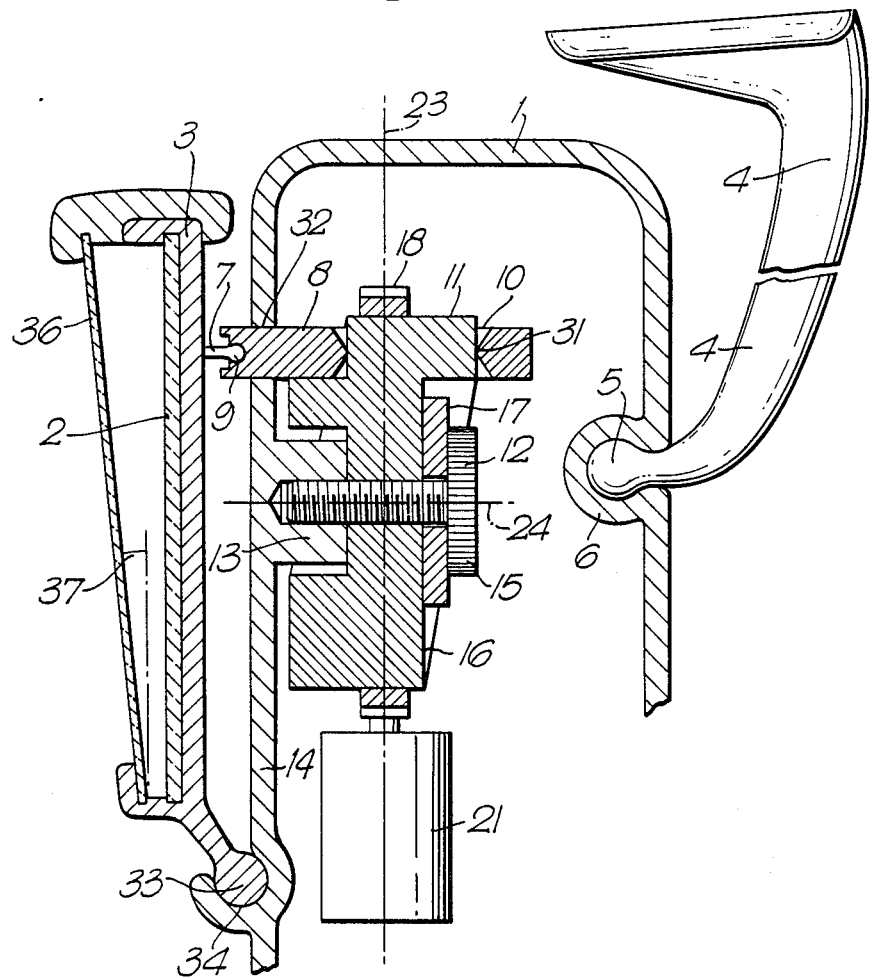
FIG. 1 is a schematic view of a rear view mirror with adjusted mirror surface when lighting intensity is strong.

A rear view mirror essentially comprises a main casing 1, a mirror casing 3 containing a mirror surface 2 and also a bearing arm 4. The rear view mirror is fastened to a vehicle (not shown) by means of the bearing arm 4, and specifically above the windscreen within the vehicle. By means of a spherically shaped end piece 5 the bearing arm 4 is arranged in a recess 6 of casing 1. The casing 1 can thus be turned vis-a-vis the bearing arm 4 which is firmly fixed to the vehicle and can be adjusted according to the various heights and sitting positions of different drivers of the vehicle.

The casing 3 is connected to an actuator 8 by means of coupling projections 7. The coupling projections 7 are rotatingly arranged in recesses 9 of the actuator 8. The actuator 8 has a further recess 10 into which a toothed wheel 11 engages. The toothed wheel 11 is rotatingly arranged in casing 1 and fastened in a guide 13 by means of threaded screw 12. The guide 13 is integral with the forward wall 14 of casing 1. In order to improve the direction of spiral and guiding accuracy of the toothed wheel 11 a disk 17 is provided between the head 15 of the threaded screw 12 and the side surface 16 of the toothed wheel 11 extending parallel to the forward casing wall 14.

Figure 10:
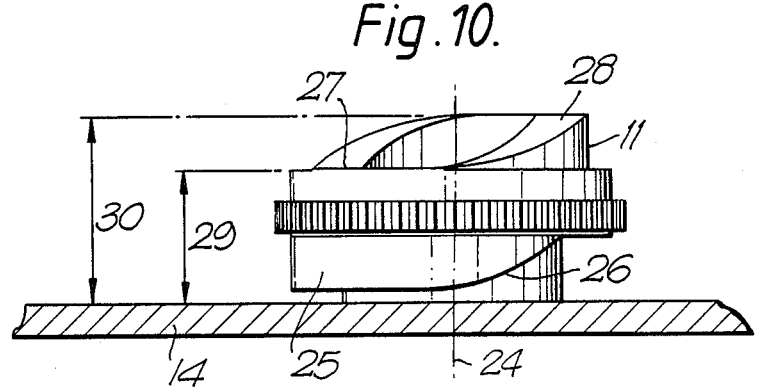
FIG. 10 is a side view fo the toothed wheel.
Figure 11:
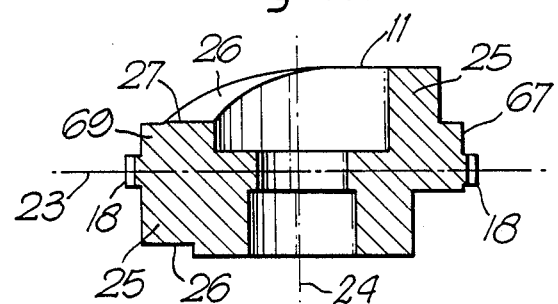
FIG. 11 is a side view of a half cut away toothed wheel.

Through teeth 18, the toothed wheel 11 engages in a helical thread 19 on the drive axle 20 of a motor 21. Whereby when the motor 21 is supplied with power through leads 22, the toothed wheel 11 rotates. The rotational plane 23 is thereby parallel to the forward casing wall 14. The toothed wheel 11 has a raised cam surface portion 26 in its outer area 25 relative to the axis of rotation 24. The cam portion 26 is such that the outer area zone 25 is the same size i.e. same height over the total circumference of the toothed wheel 11 measured normal from the plane of rotation 23. The surfaces 27, 28 FIGS. 10, 11 of the outer area zone 25 extending parallel to the plane of rotation 23 vary in distance 29, 30 from the forward casing wall 14 throughout the circumference of the toothed wheel 11 due to the desin of the raised cam portion 26.

The cam portion 26 is such that the outer area zone 25 for a quarter of its extent along the circumference of the toothed wheel 11 comprises surfaces 27, 28 at constant distances 29, 30 respectively from the forward parallel casing wall 14. In the remaining portion of outer area zone 25 the distance of the surfaces to the casing part 14 continually increases or decreases.

The actuator 8 is guided by virtue of points 31 acting on the surfaces 27, 28 and the intermediate rising and falling surface parts. In addition the actuator 8 is further guided in a slit 32 in the casing wall 14. Due to the rotating movement of the toothed wheel 11 the actuator 8 is moved normally towards or away from the forward casing part 14 through the slit 32 in accordance with the course of the cam portion 26.

Figure 2:
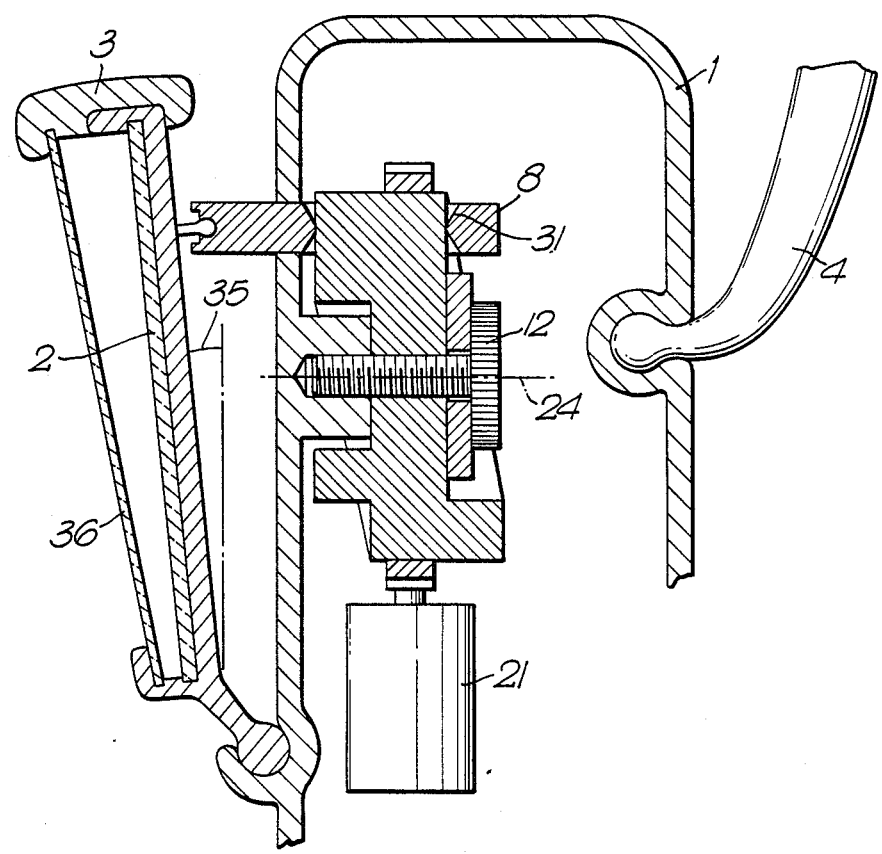
FIG. 2 is a schematic view of a rear view mirror in the unadjusted state when lighting intensity is not strong.
Figure 8:
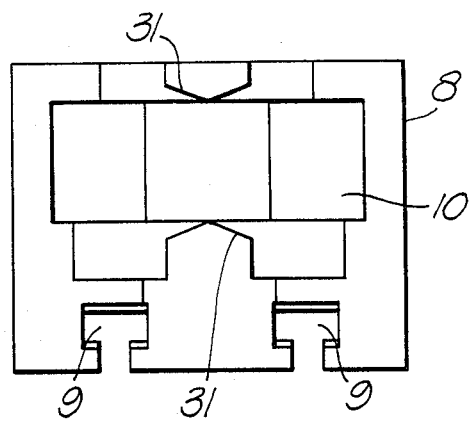
FIG. 8 is a schematic view of the actuator.
Figure 9:
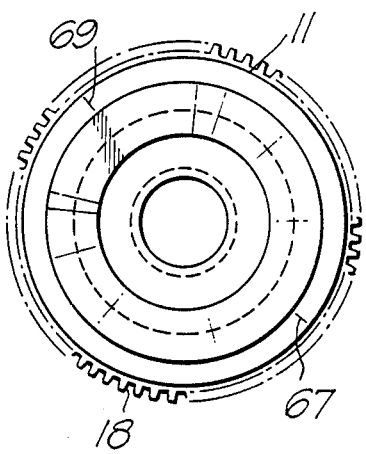
FIG. 9 is a top view of the toothed wheel.

Due to the coupling 7, 9 of the casing 3 with the actuator 8, the casing 3 in the area of the coupling projections 7 is at varying distances from casing 1. In addition, casing 3 is adjustably guided in recesses 34 of the forward casing wall 14 by means of rounded coupling parts 33. Because of the geometric arrangement of the coupling parts 7, 33, a movement of the actuator 8 out of the casing 1 brought about as a result of rotation of the toothed wheel 11 causes the mirror surface 2 to be tilted, and the actuator 8 moving into the casing 1 results in the mirror surface 2 moving to a more vertical position. When the mirror surface 2 is in the normal position shown in FIG. 2, the mirror surface 2 is at an angle to the casing wall 14. If the actuator 8 has been moved into casing 1 through rotation of the toothed wheel 11, the mirror surface 2 extends parallel to the wall 14 with the cam portion 26 at a maximum distance 30 from the casing wall 14. If the mirror had previously been adjusted so that the driver could observe following traffic due to the mirror effect, the light falling on the mirror surface is now reflected onto an area of the vehicle roof. However, so that the driver is also able to obtain information about the following traffic when the mirror surface is in this position, a glass sheet 36 is additionally provided in casing 3. In contrast to the mirror surface 2, the glass sheet is adjusted at a fixed angle 37, which is equal to the maximum angle of adjustment 35 between mirror surface 2 and casing wall 14. When the rear view mirror is in the position shown in FIG. 1 the glass sheet 36 is therefore at the same angle with respect to the casing wall 14 as the mirror surface 2 is in FIG. 2. As the glass surface also has reflective properties either the intensively reflected light from the mirror surface 2 reaches the driver's eyes, or the driver can obtain information about the following traffic through the considerably weaker image reflected from the surface of the glass sheet 36 when the rear view mirror is in the adjusted position.

Figure 13:
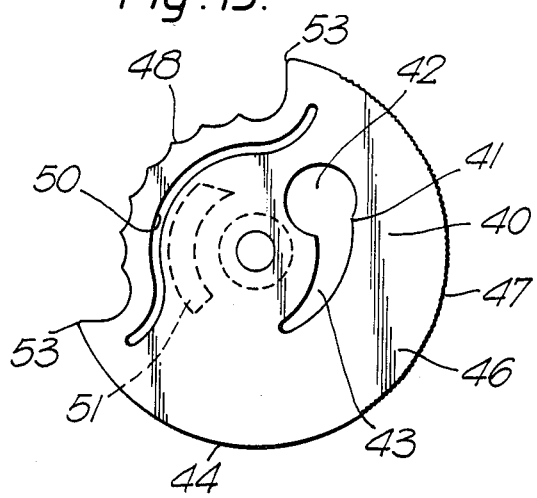
FIG. 13 is a top view of the adjusting wheel.
Figure 14:
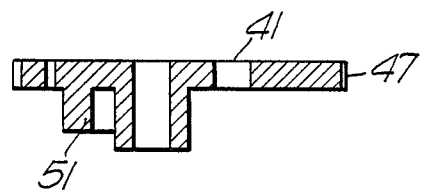
FIG. 14 is a side view of a half cut away adjusting wheel

Adjustment to the angle 35 is always useful whenever the driver is being dazzled by following traffic or when the sun is low in the sky behind the vehicle. The intense light falling on the rear view mirror in such conditions is measured by means of a photosensor 38 which is located in the casing 1 behind an aperture 39. Referring to FIG. 13 the intensity of the light falling on the photosensor 38 can be regulated by means of a screen 40 provided with a slit 41. The slit 41 is formed in such a way that in an area 42 of its length it is adapted to the rounded shape of the aperture 39 but with a larger cross-section than the latter. In an area 43 the slit is formed in such a way that it tapers away from the area 42 to end in a point. The screen 40 is part of an adjusting wheel 44 which is rotatably arranged in casing 1 and a section of the circumference 46 of which projects out of the casing 1 through an opening 45. Area 46 of the adjusting wheel 44 is knurled 47 which facilitates the driver to turn the adjusting wheel 44 and thereby regulate the amount of light falling on the photosensor 38. The knurling 47 significantly improves the transfer of force from the driver's finger to the adjusting wheel 44 compared with a smooth design of area 46.

The adjusting wheel 44 also has notches 48. In respect to the notches 48, casing 1 has a stopper 49 which engages in the notches 48. When the adjusting wheel 44 is turned the stopper 49 exerts a force on the adjusting wheel 44 which on the one hand opposes the turning force and on the other hand has a component which is directed towards the mid-point of wheel 44. Between the notches 48 and its mid-point the adjusting wheel 44 has a relief slit 50. The force component acting on the mid-point of the adjusting wheel elastically compresses the adjusting wheel 44 in the area of the relief slit 50 and therefore the adjusting wheel 44 can be turned past the stopper 49 and is nevertheless fixed in an adjustable position without the effects of external forces.

Figure 12:
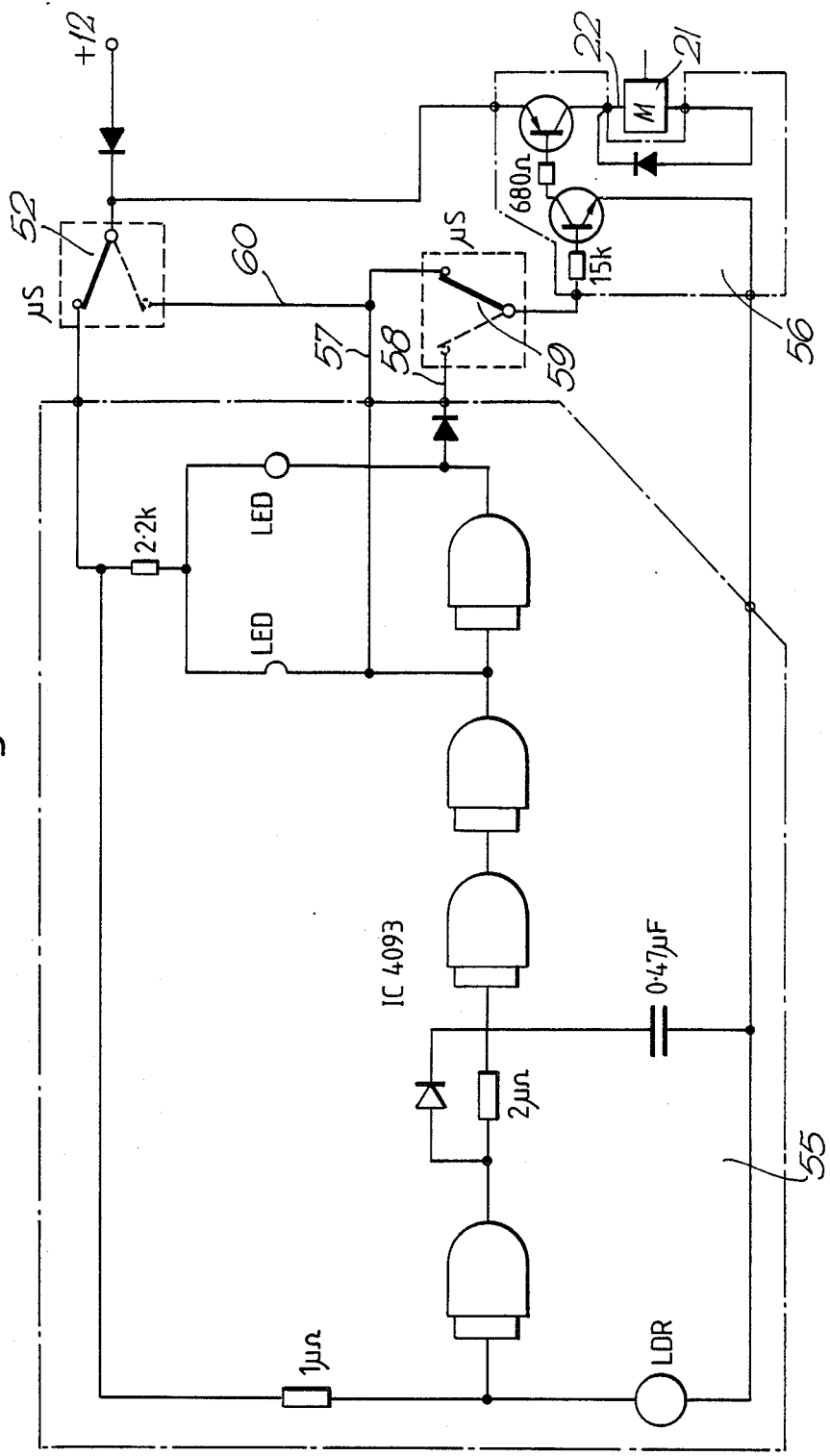
FIG. 12 is a basic sketch of the electrical switching circuit of the drive motor.

At the beginning and end of the notches 48 the adjusting wheel has two cams 53. These cams 53 limit together with the stopper 49 the rotation of the adjusting wheel 44 in its end position. In one direction of rotation the end position is reached when area 42 of the screen slit 41 is over the aperture 39 allowing maximum light to pass through. In the other direction of rotation the end position is reached when screen 40 completely covers aperture 39. In the latter position a switching cam 51 on the adjusting wheel 44 switches off the power supply of a threshold switch 55 (see FIG. 12) via an alternating switch 52 and the rear mirror is returned to its resting position by means of lead 60. The alternating switch 52 is preferably a microswitch.

The power supply can be provided by a vehicle battery 54 in which the power is taken from the circuit for the vehicle interior lighting. It is however also conceivable to provide a separate battery or accumulator which is preferably arranged in casing 1. The accumulator could for example be charged by means of solar cells.

The light falling on the photosensor 38 affects the power into the threshold switch 55. Over a certain light intensity the power is so great that the threshold switch 55 produces a control signal which is led via lead 57 and alternating switch 59 to a switch amplifier 56. The switch amplifier 56 processes this signal and controls a motor 21 via leads 22.

The thus controlled motor 21 causes the toothed wheel 11 to rotate. The opposing forces produced by the motor 21 driving the toothed wheel 11 are transferred onto members 63 of casing 1 through pins 61 which project out of both casing shields 62 of motor 21. The pins 61 are located in recesses 64 of the members 63. In addition the casing 65 of the motor 21 is adjacent to further members 66 of casing 1.

When the toothed wheel 11 rotates, the actuator 8 is pulled into casing 1. Due to the form of the slit 32 it is guided vertically to the forward casing wall 14. The toothed wheel 11 rotates until one of the switching cams 67 on the toothed wheel 11 switches over the switch 59. Switch 59 is now connected with lead 58. The switching cam 67 is arranged on the toothed wheel 11 in such a way that the motor power is interrupted when the drive points 31 of the actuator 8 are guided in the centre of area 25 of the toothed wheel 11 extending parallel to the forward casing wall at distance 30. The driver is now able to observe the traffic following him by means of the weak image reflected from the surface of the glass sheet 36.

When the intensity of the light falling on the rear view mirror decreases, the threshold switch 55 reverts to its original position below a certain light intensity. This causes a control signal to be produced on lead 58 which reaches the switch amplifier 56 via the alternating switch 59 which is still in its other position, and the switch amplifier controls the motor 21. Rotation of the toothed wheel 11 is continued and the actuator 8 is pushed out of the casing 1. Rotation of the toothed wheel 11 is interrupted when another switch cam 69 located on the toothed wheel 11 switches the alternating switch 59 back into its other position and thereby breaks the connection between lead 58 and switch amplifier 56.

Through an appropriate adjustment of the screen 40 the driver can adopt the brightness, which causes the rear view mirror to tilt, to the external lighting conditions and his own sensitivity to light. If the surrounding lighting conditions are bright only very great light intensity should cause the rear view mirror to tilt. In conditions of darkness the mirror should tilt even in weaker light as otherwise a strong dazzle effect will occur.

Both the casings 1 and 3 can be made either of metal or synthetic material and the bearing arm 4 also can be made of such materials. It would be possible to have the casings 1 and 3 combined in a single integral casing.

Figure 15:
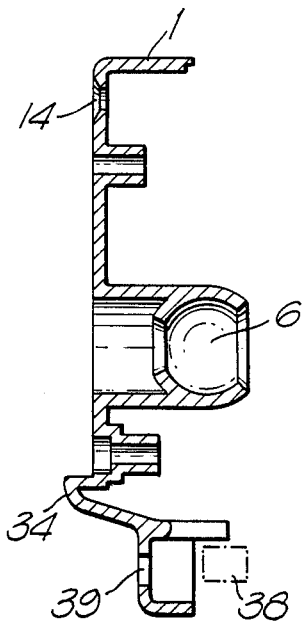
FIG. 15 shows a longitudinal cross-sectional side view of the part casing shown in FIG. 6.

The casing 1 could be of multipart form and FIG. 15 shows in sectional elevation a possible arrangement for a front part of the casing: this front part provides the front wall 14 of the casing.

We claim:

1. A rear view mirror for a vehicle with an adjustable mirror surface to prevent the effects of dazzle; said rear view mirror comprising a mirror unit including a mirror, and a drive gear for automatically tilting the mirror unit from a normal position to a tilted position when a dazzle effect is present on the mirror in said normal position, said drive gear being housed in a drive gear casing, the mirror unit being pivotally mounted on the drive gear casing for pivoting relative to the drive gear casing: the drive gear comprising a cam member rotatably mounted in the drive gear casing said cam member comprising a pair of oppositely-facing annular cam surfaces, each cam surface having a first land lying in a flat plane and defining a datum, and a second land lying in a flat plane spaced from the plane of said first land and defining a lift surface portion, said first and second lands being joined by inclined connecting surface portions, an actuator engaging each of said annular cam surfaces and connected to the mirror unit so as to tilt the mirror unit on rotation of the cam member, the lift surface portion of one cam surface being diametrically opposed to the lift surface portion of the other cam surface whereby on rotation of the cam member one cam surface serves to move the actuator outwardly relative to the drive gear casing while successively the other cam surface serves to move the actuator inwardly relative to the drive gear casing, an electric motor drivingly connected to the cam member for driving the cam member in a constant single direction, and electric circuit means connected to said motor and including light sensing means for the provision of control signals and switch means controlling the driving of the electric motor.

2. A rear view mirror according to claim 1, wherein the cam member comprises a toothed wheel.

3. A rear view mirror according to claim 2, wherein the motor includes an output drive shaft directly coupled to the toothed wheel.

4. A rear view mirror according to claim 3, wherein said output drive shaft includes helical toothing meshing with the teeth of the toothed wheel.

5. A rear view mirror according to claim 2, wherein the toothed wheel is rotatably carried by a forward wall of the drive gear casing.

6. A rear view mirror according to claim 5, wherein the electric motor is arranged sideways by means of support members in the drive gear casing so that the motor extends parallel to said forward wall of the drive gear casing.

7. A rear view mirror according to claim 2, wherein the toothed wheel projects into a recess of the actuator, the actuator being guided in a slit in a wall of the drive gear casing.

8. A rear view mirror according to claim 7, wherein the actuator is guided on the cam surfaces by means of contact edges.

9. A rear view mirror according to claim 1, wherein the actuator is pivotally coupled to the mirror unit by means of a coupling arrangement comprising recess means and coupling projections located in said recess means.

10. A rear view mirror according to claim 1, wherein the mirror unit includes a mirror casing.

11. A rear view mirror according to claim 10, wherein the mirror casing is pivotally coupled to the drive gear casing by a pin-and-recess coupling.

12. A rear view mirror according to claim 1, wherein a sheet of glass is contained within a mirror casing of said mirror unit.

13. A rear view mirror according to claim 12, wherein the sheet of glass is at an angle to a major mirror surface of the mirror unit.

14. A rear view mirror according to claim 1, wherein pins are fixed to casing shields of the motor.

15. A rear view mirror according to claim 1, wherein power leads are provided to connect the electric motor to a power source.

16. A rear view mirror according to claim 15, wherein said power source comprises a battery.

17. A rear view mirror according to claim 1, wherein control means are provided for the light sensing means and are operable to set the light intensity level at which a control signal is issued to cause tilting of the mirror unit to said tilted position.

18. A rear view mirror according to claim 17, wherein said control means comprises an adjusting wheel arranged to rotate in said drive gear casing, light passing to the light sensing means being via an aperture in the drive gear casing and the adjusting wheel providing a screen to adjustably close said light aperture in the drive gear casing.

19. A rear view mirror according to claim 18, wherein the adjusting wheel has a screen aperture, and the light sensing means comprises a photosensor located behind said screen aperture.

20. A rear view mirror according to claim 19, wherein said screen aperture is in the form of a screen slit, and the screen slit has at one end a rounded portion defining a maximum aperture size which is of larger cross-sectional area than the aperture in the drive gear casing through which light passes to the photosensor via said screen slit.

21. A rear view mirror according to claim 20, wherein the screen slit narrows to a point at the end of the slit opposite to that of said rounded portion.

22. A rear view mirror according to claim 18, wherein the adjusting wheel has knurling in a peripheral portion of the wheel.

23. A rear view mirror according to claim 22, wherein said knurling of the adjusting wheel projects through an opening in the drive gear casing.

24. A rear view mirror according to claim 18, wherein the adjusting wheel has a series of notches on a peripheral portion, and a stationary stopper co-operates with the notches to firmly locate the adjusting wheel in a selected position.

25. A rear view mirror according to claim 24, wherein the series of notches is bordered by two cam formations.

26. A rear view mirror according to claim 17, wherein the switch means of the electric circuit means includes a first switch device forming part of said control means.

27. A rear view mirror according to claim 26, wherein a switching cam is provided to operate said first switch device.

28. A rear view mirror according to claim 27, wherein said switching cam is part of said adjusting wheel.

29. A rear view mirror according to claim 1, wherein the light sensing means are connected to a threshold switch device which is actuatable by signals dependent on the light intensity level sensed by said light sensing means.

30. A rear view mirror according to claim 29, wherein the threshold switch device is electrically connected to a switching amplifier.

31. A rear view mirror according to claim 30, wherein the switching amplifier is electrically connected to the electric motor by conduit means.

32. A rear view mirror according to claim 36, wherein the threshold switch device is connected to the switching amplifier via a second switch means.

33. A rear view mirror according to claim 32, wherein said second switch is an alternating switch means.

34. A rear view mirror according to claim 33, wherein said second switch is operated by means of switching cams on the cam member such that the electric motor is stopped when (a) the mirror unit is tilted by the cam member to said tilted position and when (b) the mirror unit is returned to the normal position.

* * * * *